March 20, 1928.

A. WOLLENSAK

PHOTOGRAPHIC SHUTTER

Filed June 18, 1925

INVENTOR.
Andrew Wollensak
BY
his ATTORNEY

March 20, 1928.                                                1,663,326
A. WOLLENSAK
PHOTOGRAPHIC SHUTTER
Filed June 18, 1925            3 Sheets-Sheet 2
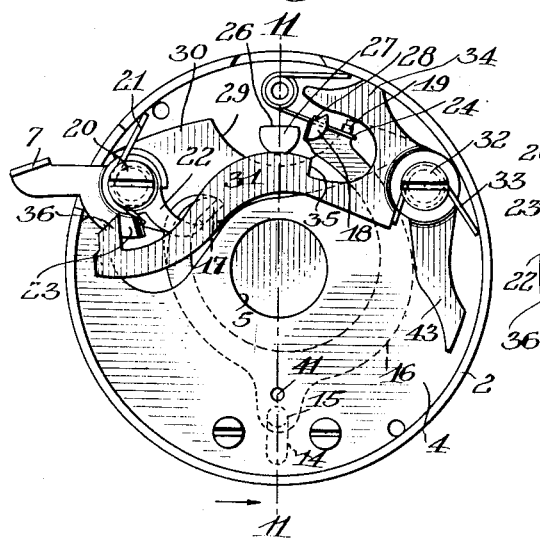
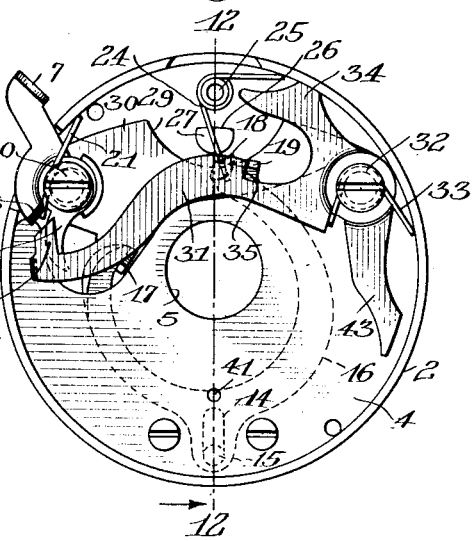
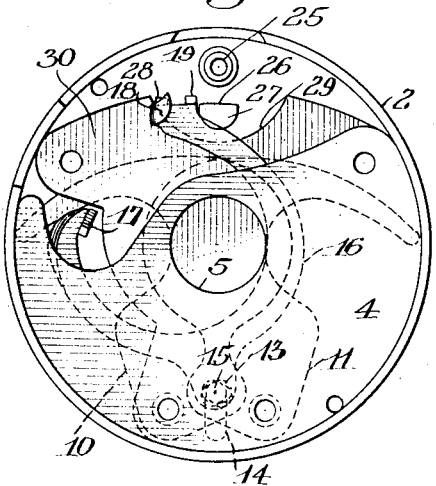
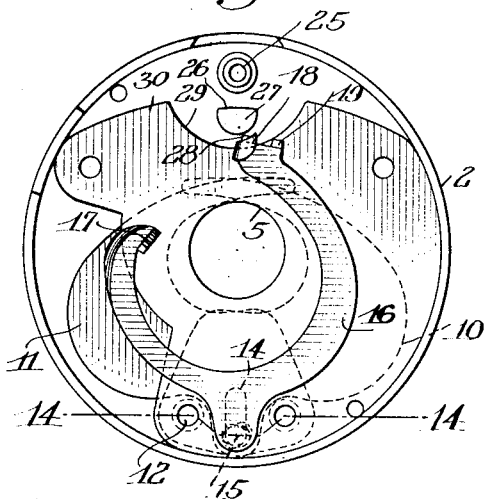
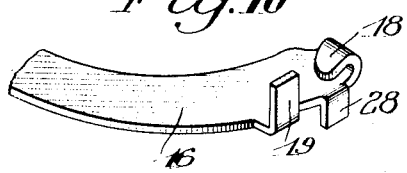
INVENTOR.
Andrew Wollensak
BY
his ATTORNEY March 20, 1928.

A. WOLLENSAK

PHOTOGRAPHIC SHUTTER

Filed June 18, 1925

INVENTOR.
Andrew Wollensak
BY
his ATTORNEY

Patented Mar. 20, 1928.

1,663,326

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK, A CORPORATION OF NEW YORK.

PHOTOGRAPHIC SHUTTER.

Application filed June 18, 1925. Serial No. 37,981.

My present invention relates to photography and more particularly to photographic shutters and it has for its object to provide a simple and efficient shutter of the pivoted blade type which can be manufactured at low cost and in which the time and instantaneous exposures can be regulated in a simple manner and with certainty. A further object of the invention is to so co-ordinate the timing mechanism with the shutter diaphragm that an adjustment of the latter will automatically regulate the timing or, in other words, the adjustment of the shutter for time or instantaneous exposure will result in a proper adjustment of the diaphragm so that sufficient light will be admitted for the particular exposure that is planned. To these and other ends the invention resides in certain improvements and combinations of parts all as will be hereinafter more fully described, the novel features being pointed out in the claims at the end of the specification.

In the drawings:

Figure 6 is a front view of interior parts of the shutter adjusted for a time exposure and showing the master member energized and about to be released, the blades being still closed;

Figure 7 is a similar view with the master member released and the blades open;

Figure 8 is an interior view showing the position of the blades and master member at the beginning of the opening movement, certain of the overlying parts being removed;

Figure 9 is a similar view showing the positions of the parts with the blades open and about to close again;

Figure 10 is an enlarged detail view of the actuating end of the master member;

Similar reference numerals throughout the several views indicate the same parts.

To first give a general idea of certain features of my invention I have shown in the present embodiment a shutter of a simple type having time and instantaneous adjustments, the instantaneous exposures being of uniform duration. A diaphragm is used having an aperture that cuts down the light for a time exposure but which is moved into a neutral position for an instantaneous exposure requiring greater light. The diaphragm also acts as a regulator for adjusting the positions of the interior parts for a time or instantaneous exposure so that the one adjustment takes care of both the shutter operation and corresponding correct position of the diaphragm. A further feature of the invention resides in the manner in which a time exposure is effected with only one time stop whereas, usually two stop levers are required. In addition to these improvements, I have provided a novel construction for the actuation of the shutter blades which results in a mechanism having very few parts and readily assembled.

Figure 1:
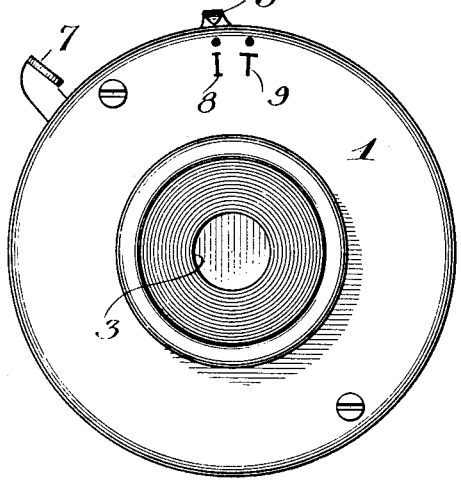
Figure 1 is a front view of a shutter in normal position constructed in accordance with and illustrating one embodiment of my invention, the diaphragm being arranged for an instantaneous exposure and the regulator being similarly adjusted.
Figure 2:
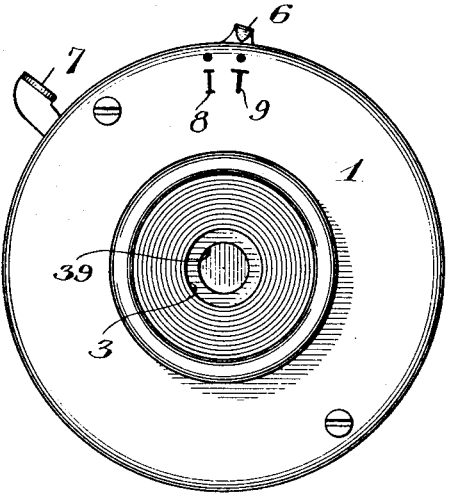
Figure 2 is a similar view with the regulator adjusted for a time exposure.

Referring more particularly to the drawings, 1 indicates the front cover plate and 2 the casing of a shutter of the usual modern annular design, the lens opening in the cover plate being indicated at 3 and the opening in the partition plate 4 in the interior of the case at 5. The indicator or exterior portion of the regulating device is shown at 6 and the operating lever for the shutter at 7. The present shutter is of the "automatic" as distinguished from the "set" type. The regulator indicator 6 is moved between the positions 8 and 9 as shown in Figures 1 and 2 in the first of which the shutter is set for an instantaneous exposure and in the second of which it is set for a time exposure.

Figure 13:
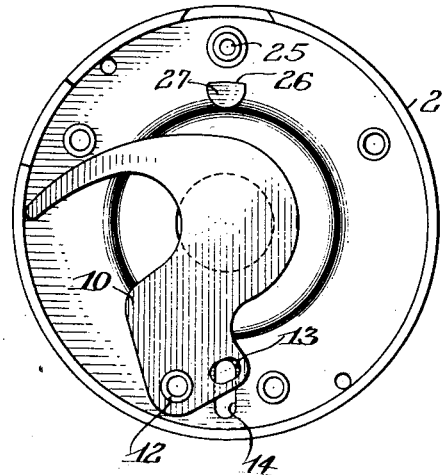
Figure 13 is a front view of the inside of the casing with everything removed except one shutter blade and Figure 14 is an enlarged section showing a fragment of the mechanism through the blade pivots and actuating pin on the line 14—14 of Figure 9.
Figure 14:
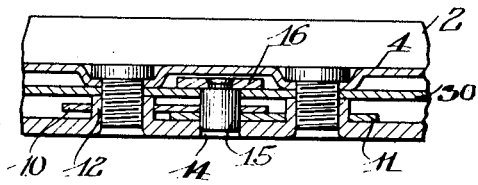

The shutter is of the pivoted blade opposite movement type and two blades 10 and 11 are provided. One of them and its mounting is clearly shown alone in Figure 13 in closed position. It is carried on a pivot 12 and has an elongated opening 13 that traverses a guide slot 14 in the rear of the casing. It will be seen that when a pin 15 that occupies the slot 14 and extends through the openings 13 of the two blades is reciprocated, it will open and close the shutter aperture, first spreading and then overlapping the blades as shown in Figures 9 and 8 respectively.

The pin 15 is carried on the central or connecting portion of a yoke shaped master lever 16 best shown in Figure 9. The left arm thereof is provided with an operating lug 17 while the other arm is provided with a hook portion 18 with an adjacent upturned lug 19 between which is held the main spring that opens and closes the blades by moving the master member bodily in upward and downward directions to carry the pin 15 up and down in the slot 14 in the manner hereinafter described. The operating lever 7 is pivotally mounted on a stud 20 and is held in the normal position of Figures 1, 3 and 7 for instance, by a spring 21 coiled about the stud and reacting against a wall of the casing. It is provided with a lower arm 22 and an upper arm 23. The arm 22 has a slip-off engagement with the operating lug 17 of the master member and when the operating lever 7 is depressed, it carries the master member 16 from the position of Figure 3 to that of Figure 6 but inasmuch as the pin 15 on the master member is already at the top of the slot 14, there is no effect upon the blades which remain closed at the time the arm 22 slips off of the operating lug 17 as in Figure 6.

Figure 3:
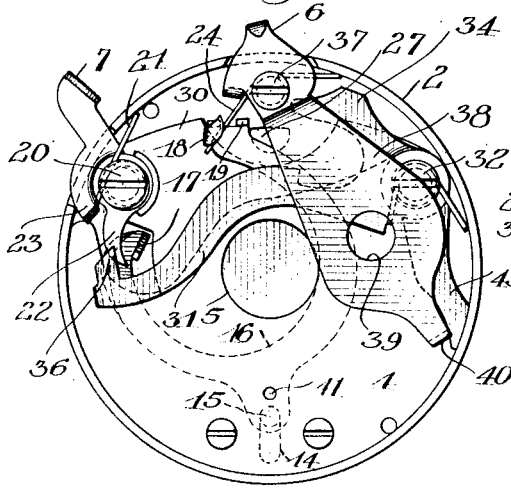
Figure 3 is a front view of the interior of the shutter with the cover plate removed and with the regulator adjusted for an instantaneous exposure as in Figure 1.
Figure 4:
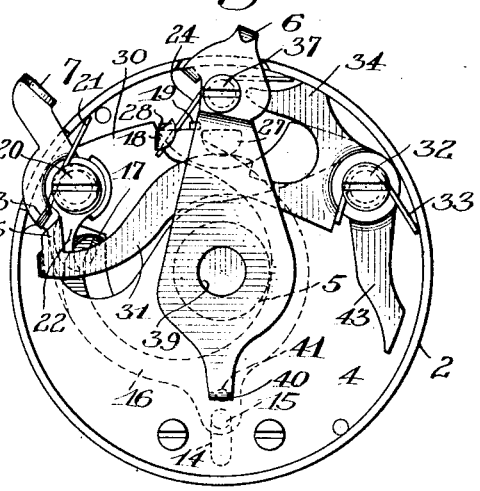
Figure 4 is a view similar to Figure 3 with the regulator adjusted for a time exposure as in Figure 2.
Figure 5:
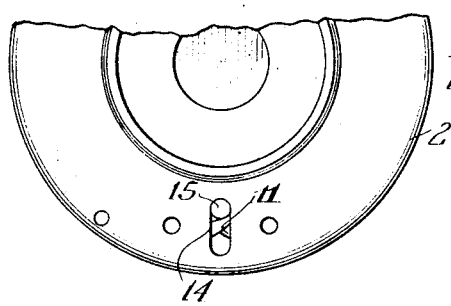
Figure 5 is a fragmentary view of one of the rear plates of the shutter casing.
Figure 11:
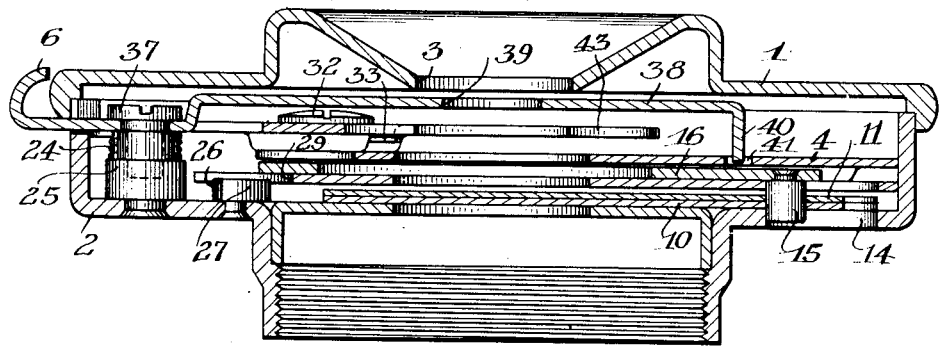
Figure 11 is an enlarged section taken on the line 11—11 of Figure 6 but through the entire shutter.
Figure 12:
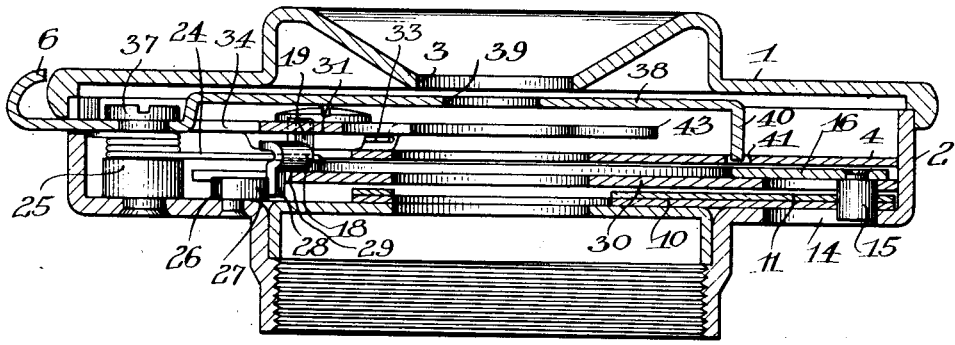
Figure 12 is a similar view taken on the line 12—12 of Figure 7.

The main spring 24 of the shutter is coiled about a stud 25 and reacts against the shutter wall while engaging with one arm against the hook portion 18 of the master lever and between said hook portion and the upturned lug 19 as previously described. Its normal position is shown in Figures 3 and 4 in which it has a tendency to lift the master member so that its pin 15 occupies the top of the slot 14 and holds the blades closed. The operating member 7, however, and the engagement of its arm 22 carries the master member to a position in which the arm of the spring 24 crosses its own center and thereafter has a tendency to thrust the master member downwardly and open the blades. This position is shown in Figure 6 at the slip-off point. In the meantime and while the main spring is being wound or energized to this position and is crossing the center, it is prevented for a time from exerting its downward blade opening movement upon the master member 16 by a substantially flat guide surface 26 on a pin 27 fixed to the rear wall of the shutter casing. This guide 26 is engaged by a downwardly projecting lug 28 on the master member best shown in Figure 10. The opposite face of the pin 27 is arcuate and as soon as the lug 28 of the master member leaves the guide 26 the master member is free to move downwardly under the influence of the main spring and to open the blades as shown in Figures 6 and 7. In so doing, the lug 28 rides between the arcuate portion of the lug 27 and an arcuate guide 29 on a mounting and partition plate 30 in the interior of the shutter. As it reaches the end of the guide 29 it resumes its normal position, the spring 24 having passed back across its center after opening the blades and then having a tendency to lift the master member and hold the blades closed as in Figures 3 and 4. The operation just described occurs in both an instantaneous and a time exposure except that in the instantaneous exposure the movements are continuous so that as the lug 28 of the master member slips off of the guide 26 with the winding of the main spring it instantly drops to the guide 29; opens and closes the blades and resumes the normal position of Figure 3. With a time exposure this movement is halted while the blades are open and with the master lever and main spring in the position of Figure 7. To accomplish this I provide a single time stop lever 31 pivoted on a stud 32 and having a spring 33 coiled about the stud and normally reacting against the casing to hold the stop lever in the position of Figure 7 defined by contact of an arm 34 thereon with the casing wall in which position a shoulder 35 on the lever is held in the path of lug 19 on the master lever. The lug 19 engages this shoulder while the blades are open and as the arm 22 has slipped off of the master member at 17 they remain open until the operating lever 7 is again depressed. When it is so again depressed the arm 22 does not reach the lug 17 of the master member because the latter is in its lowered position. The upper arm 23, however, of the operating member does engage a cam surface 36 on the time stop lever 31 and depresses the latter against the tension of its spring 33 as shown in Figure 4. This disengages the time stop lug 19 on the master lever 16 from the shoulder 35 and permits the main spring 24 to complete its actuation of the master member from the downward position of Figure 7 and Figure 9 to the upward position of Figures 4 and 8 in which the blades are closed by reason of the spring 24 re-crossing its center and resuming its normal position.

After slipping off of the operating lug 17 of the master member, the arm 22 of the operating lever is adapted to reengage with it on an instantaneous exposure by virtue of the fact that the arm of the master lever carrying the lug 17 is a spring arm and the lug 17 itself is inclined or cam shaped so that the arm 22 may depress it and slip back over it into engaging position. Similarly, the upper arm 23 of the operating lever 7 has an inclined surface whereby, after passing the cam portion 36 of the stop lever 31 it may slip back to engaging position due to the fact that the arm 31 is also a spring arm. Of course, during an instantaneous exposure, it is necessary that the time stop lever 31 should be moved to the neutral position of Figure 3 wherein the shoulder 35 thereon is cleared of the path of the lug 19 on the master member. This is accomplished through manipulation of the controller 6. The controller 6 turns on the stud 25 beneath a screw 37. It is part of a diaphragm plate 38 having a restricted aperture 39 therein of smaller diameter than the lens aperture 5 that is used for instantaneous exposure. When the diaphragm 38 is moved to the position of Figures 2 and 4 so that the restricted aperture 39 becomes coincident with the lens aperture for a time exposure, the time stop lever 31 is operative and free to act as described. In this position the diaphragm is centered by a down turned finger 40 which snaps into an aperture 41 in the partition plate 4 overlying the mounting plate 30. When an instantaneous exposure is desired, the diaphragm 38 is moved to the position of Figure 4 out of register with the lens opening 5 and so that the finger 40 engages an arm 43 on the stop lever 31 and depresses it as shown in Figure 3. Thus, the stop shoulder 35 is removed from the path of the lug 28 on the master lever and the cam surface 36 is also removed from the path of the upper arm 23 of the operating lever 7 so that the movements of the latter and of the master member proceed independently of the stop lever 31.

I claim as my invention:

1. In a photographic shutter, the combination with a blade mechanism and an operating member, of a master member adapted to actuate the blade mechanism and having a combined pivotal and bodily movement influenced by the operating member.

2. In a photographic shutter, the combination with a blade mechanism, of a master member having a combined pivotal and reciprocatory movement and connected to operate the blades thereby, a spring for reciprocating the master member and an operating member also adapted to reciprocate it and to also wind the spring.

3. In a photographic shutter, the combination with a pair of pivoted blades having opposite movement, of a guide, a master member adapted to reciprocate in the latter and connected to the blades to open and close the same, a spring having a swinging movement and engaging the master member to reciprocate the same as the spring swings across a dead center, and an operating member cooperating with the master member to energize the spring.

4. In a photographic shutter, the combination with a pair of pivoted blades having opposite movement, of a guide, a master member adapted to reciprocate in the latter and connected to the blades to open and close the same, a spring having a swinging movement and engaging the master member to reciprocate the latter as the spring swings across a dead center, a switch cam for guiding the movement of the master member, and an operating member cooperating with the master member to energize the spring.

5. In a photographic shutter, the combination with a blade mechanism and an operating member, of a master member adapted to actuate the blade mechanism and having a combined pivotal and bodily movement, a spring for actuating the master member and adapted to be energized by the operating member.

6. In a photographic shutter, the combination with a pair of pivoted blades having opposite movement, of a master member having reciprocatory movement and connected to the blades to open and close the same, said master member also having a swinging movement, an operating member adapted to swing the master member in one direction and a spring adapted to swing it in the other direction and to also cause its reciprocation.

7. In a photographic shutter, the combination with a pair of pivoted blades having opposite movement, of a master member having reciprocatory movement and connected to the blades to open and close the same, said master member also having a swinging movement, an operating member adapted to swing the master member in one direction, a guide for holding the master member against reciprocatory movement during such actuation by the operating member, and a spring for returning the master member and at the same time reciprocating the same.

8. In a photographic shutter, the combination with a pair of pivoted blades having opposite movement, of a master member having reciprocatory movement and connected to the blades to open and close the same, said master member also having a swinging movement, an operating member adapted to swing the master member in one direction, a guide for holding the master member against reciprocatory movement during such actuation by the operating member, a spring for returning the master member and a guide adapted to cause the spring action to also reciprocate the master member and actuate the blades.

9. In a photographic shutter, the combination with a pair of pivoted blades having opposite movement, of a master member having reciprocatory movement and connected to the blades to open and close the same, said master member also having a swinging movement and comprising a yoke shaped member embodying a pair of arms, an operating member engaging one of said arms to swing the master member in one direction, a guide for holding the master member against reciprocatory movement during such operation from the operating member, a spring engaging the other arm for returning the master member, and a guide adapted to cause the spring action to also reciprocate the master member and actuate the blades.

10. In a photographic shutter, the combination with a blade mechanism and a master member for actuating the same having a combined reciprocatory and swinging movement, of an operating member for swinging the master member in one path, a spring for swinging the master member in the opposite direction, a guide adapted to direct a reciprocating movement of the master member also under the action of the spring, a time stop for latching the master member during its reciprocatory movement and means on the operating member for releasing the time stop.

11. In a photographic shutter, the combination with a blade mechanism and operating mechanism therefor including a master member and time stop for the latter, of a diaphragm operable from the exterior of the shutter and arranged to control the time stop.

12. In a photographic shutter, the combination with blade mechanism and operating mechanism therefor including a master member, of a time stop for halting the movement of the master member and a swinging diaphragm operable from the exterior of the shutter and adapted to control the time stop.

ANDREW WOLLENSAK.